R. W. LEWIS.
CLUTCH CONTROLLING DEVICE.
APPLICATION FILED JULY 31, 1919.

1,409,739. Patented Mar. 14, 1922.

Witnesses
Nelson H. Copp
Edw H Cumpston

Inventor
Robert W. Lewis
By Frederick F. Church
his Attorney

UNITED STATES PATENT OFFICE.

ROBERT W. LEWIS, OF ROCHESTER, NEW YORK, ASSIGNOR OF ONE-HALF TO GORDON LEE AND ONE-HALF TO ALLEN H. HUGHES AND HAROLD S. CURREN, ALL OF ROCHESTER, NEW YORK.

CLUTCH-CONTROLLING DEVICE.

1,409,739.  Specification of Letters Patent.  Patented Mar. 14, 1922.

Application filed July 31, 1919. Serial No. 314,517.

*To all whom it may concern:*

Be it known that I, ROBERT W. LEWIS, a citizen of the United States, residing at Rochester, in the county of Monroe and State of New York, have invented certain Improvements in Clutch-Controlling Devices; and I do hereby declare the following to be a full, clear, and exact description of the same, reference being had to the accompanying drawings, forming a part of this specification, and to the reference numerals marked thereon.

This invention relates to attachments for motor vehicles, and, more particularly, to devices of this character having to do with the control of the clutch for connecting and disconnecting the motor from the parts driven thereby, one object of the invention being to provide motor vehicles of the type having a pulley, gear or other element, driven by the motor through the clutch, for driving apparatus separate from the vehicle, as for example, a threshing machine, hay loader or the like, with a convenient means for locking the clutch in disengaged position so that such element and the apparatus driven thereby may be disconnected from the motor, for freeing the latter of load when starting it, or for stopping the apparatus without stopping the motor.

Another object is the provision for use with motor vehicles of the class described of a clutch controlling device of the above character adapted to automatically engage and retain the clutch lever when the latter is moved to clutch disengaging position, together with means for conveniently moving the device to and securing it in an inactive position, as when employing the clutch to drive the vehicle.

Still a further object is the provision in conjunction with a device of the above character of a rest for the operator's foot so arranged as to prevent the inadvertent contact of the foot with and its injury by the driving element, the hot exhaust pipe, or other part. To these and other ends the invention consists in certain improvements and combinations of parts, all as will be hereinafter more fully described, the novel features being pointed out in the claims at the end of the specification.

In the drawing.

Similar reference characters throughout the several views indicate the same parts.

Figure 1:
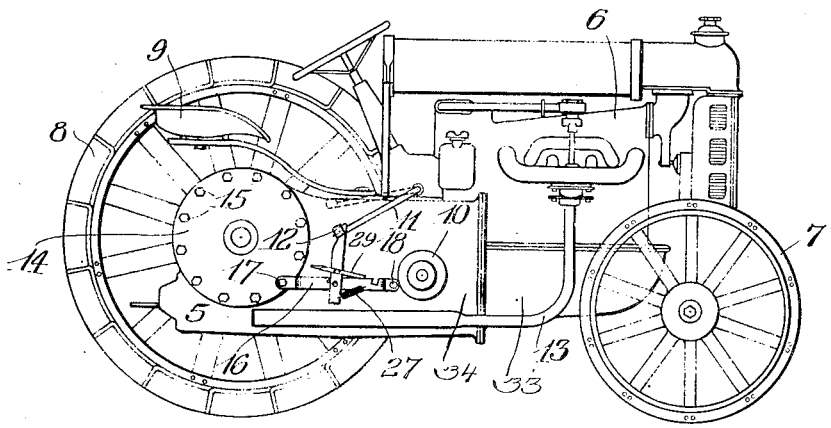
Figure 1 is a side elevation of a motor vehicle of the tractor type, with one of the rear wheels removed, illustrating the application of the invention thereto.
Figure 2:
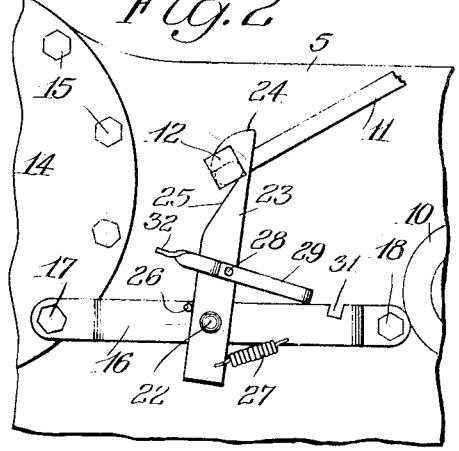
Figure 2 is a fragmentary side elevation of the vehicle frame and clutch lever showing the invention applied thereto, with the parts in active position.

This invention, in that one of the possible embodiments thereof which is at present preferred as best illustrating the principles involved, comprises a device adapted for attachment to a motor vehicle, and especially useful in conjunction with a vehicle of the farm tractor type, such for example as that illustrated in Figure 1, having a frame indicated generally at 5 and a motor 6, supported on front wheels 7 and rear driving wheels 8. 9 represents the operator's seat, and 10 a pulley commonly provided in apparatus of this nature for use in driving apparatus separate from the vehicle, while the latter is stationary, such for example as a threshing machine, hay loader, pump or the like, by means of a belt extending from the pulley forward between the front wheels to the apparatus to be driven. Beneath the engine 6 and enclosed in the crank case 33 is the usual shaft provided adjacent the engine with a clutch located in the forward part of the casing 34 while the transmission gearing is located in the after part of this casing 34. Between the clutch and transmission gearing is the driving member 10, which arrangement is old. The pulley, of course, is driven by the vehicle motor and is preferably connected as has been done before to the driving shaft between the usual clutch and transmission or speed changing gearing which drives the rear wheels of the vehicle, as well known in the art. The speed changing gearing, as usual, may be shifted to a neutral position when it is desired to disconnect the motor from the vehicle wheels.

At 11 is represented the clutch lever having a suitable foot pedal 12 or other clutch controlling part. 13 represents the motor exhaust pipe which commonly passes toward the rear of the vehicle under the clutch pedal. The near rear wheel in Figure 1 is removed for the purpose of disclosing the above parts, 14 representing the rear axle casing, fixed by means of bolts 15 to the differential casing, the above being a construction commonly found in motor vehicles of the farm tractor type.

Figure 3:
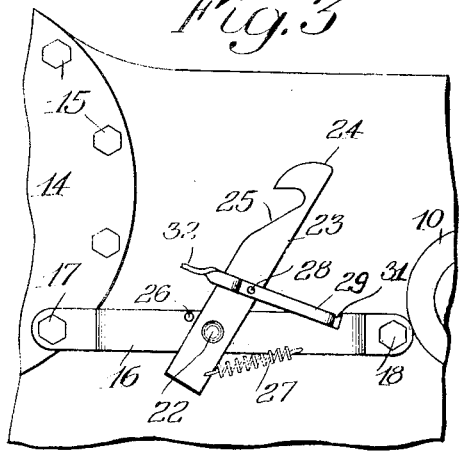
Figure 3 is a similar view with the parts in inactive position.
Figure 4:
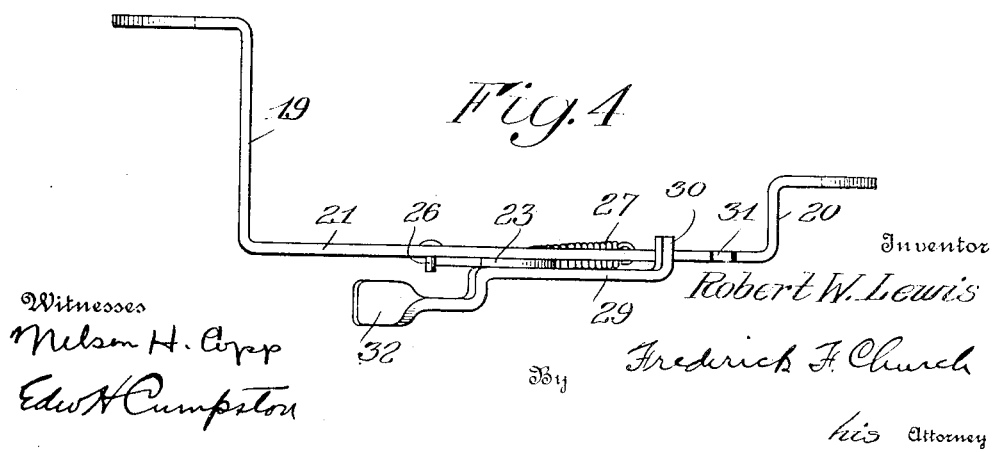
Figure 4 is a top plan view of the clutch controlling attachment.

The attachement comprised in the present invention, and adapted for employment in conjunction with apparatus such as that described above, preferably includes an angular frame or bar 16 secured at its rear end 17 under one of the bolts 15 holding the rear axle casing in place, the other end of the bar being secured to the vehicle frame by means of a bolt 18. The attached frame 16 has angular portions 19 and 20 projecting from the vehicle and united by a substantially straight portion, member 21 to which is pivoted, preferably by means of a bolt 22, an arm or hook 23 having an upper end 24 formed to engage or hook over the portion of the foot pedal 12 at its inner end adjacent the lever 11. Arm 23 below its hook portion is provided with a cam surface 25 adapted to be engaged by the pedal when the latter is depressed to its extreme extent, serving to turn arm 23 about its pivot to such a position, illustrated in Figure 3, as to be out of engagement with the pedal and therefore in inactive position. A pin or stop 26 on frame 16 limits the movement of the arm in the opposite direction and the arm is normally urged in such direction and yieldably held against stop 26 by means of a spring or other means 27 attached to the lower end of the arm and to the frame. It is apparent from this construction that arm 23 is normally urged to such a position as to engage and retain the clutch pedal when the latter is depressed to disengage the clutch, thus providing means for maintaining the motor disconnected from the driving pulley 10. The construction of apparatus of this nature is commonly such that there is not sufficient room or space between the parts to permit of the belt being readily removed from the pulley 10 and the attachment thus affords the important advantage of permitting the motor to be started without any load upon it, as might otherwise be necessary if no means were provided for holding the clutch disengaged.

When the vehicle is being moved from place to place it is desirable to provide means for holding the clutch arm or hook 23 in an inactive position, so that it will not interfere with the manipulation of the clutch. To this end there is pivoted at 28 on the arm 23, a catch or detent 29, having an angular end or finger 30 adapted to drop into a notch or shoulder 31 formed in frame 16 when the hook is moved to inactive position. The hook may be so positioned by pressing the foot upon its upper end 24, but this is most easily accomplished by full depression of the clutch pedal, which cooperating with the cam surface 25, moves the hook to inactive position where it is retained by detent 29. The latter is provided at its other end with an operating portion 32 adapted to be depressed by the operator's foot for tripping the detent and allowing spring 27 to move the hook to active position when it is desired to make use of it as described above.

In conjunction with the functions of the device described above, the angular portion 19 of the frame serves the useful purpose of providing a rest for the operator's foot, so located that when the foot is placed thereon, with the heel in rear of portion 19, the foot is comfortably supported and protected from contact with and injury by the driving pulley 10, or its belt, or the hot exhaust pipe 13.

In operation, while the vehicle is being driven from place to place, the hook is moved to inactive position by the means described above and there retained by the detent 29 leaving the clutch free for movement in the operation of the vehicle. At such times as it is desired to employ the vehicle as a stationary power plant for driving other apparatus by means of the pulley 10, detent 29 is tripped by pressure on its portion 32, and spring 27 moves the hook to such position that when the clutch pedal is depressed it is engaged and retained by the hook and the driving pulley 10 and the parts driven thereby, as well as the vehicle, are unclutched from the motor to permit the latter to be started free of load, the speed changing gearing, of course, being placed in neutral position before the clutch is reengaged. The device also provides a convenient means for stopping the pulley 10 and the apparatus driven thereby and maintaining them stationary without stopping the motor itself, and it is very simple in construction and effective in operation, and is readily attached to the vehicle.

I claim as my invention:

1. The combination with a motor vehicle having an element driven by the motor for driving apparatus other than the vehicle and a clutch controlling device for clutching and unclutching said vehicle and element from the motor, of a foot rest and clutch lock comprising a frame secured to the vehicle serving as a rest for supporting and guarding the foot when removed from said device, and a lock on said frame for engaging said device to lock the clutch in disengaged position.

2. The combination with a motor vehicle having an element driven by the motor for driving apparatus other than the vehicle and a clutch controlling device for clutching and unclutching said vehicle and element from the motor, of a foot rest and clutch lock comprising a frame secured to the vehicle and adapted to support the foot in a position protected from contact and injury by other parts, a lock on the frame for engaging said device to lock the clutch in disengaged position, and a detent for securing said lock in inoperative position.

3. The combination with a motor vehicle having an element driven by the motor for driving apparatus other than the vehicle and a clutch controlling device for clutching and unclutching said vehicle and element from the motor, of a foot rest and clutch lock comprising a frame secured to the vehicle and adapted to support the foot in a position protected from contact and injury by other parts, a lock on the frame for engaging said device to lock the clutch in disengaged position, means for moving said lock to position for engaging said device, and a detent for securing the device in inoperative position.

4. The combination with a motor vehicle having thereon an element for driving apparatus separate from the vehicle and a clutch controlling part for disconnecting said vehicle and element from the motor, of a member adapted to engage and hold said part in clutch disengaging position for disconnecting the motor from said element and the apparatus driven thereby when starting the motor or stopping said apparatus, means for moving said member to position for engaging said part, and a detent adapted upon further movement of said part to secure said member in inoperative position.

5. In a motor vehicle, the combination with a clutch controlling part, of a member adapted to automatically engage and hold said part in clutch disengaging position, and detaining means adapted on further movement of said part to hold said member out of the path of movement of said part.

6. The combination with a motor vehicle having thereon an element for driving apparatus separate from the vehicle and a clutch controlling part for disconnecting said vehicle and element from the motor, of a member adapted to automatically engage and hold said part in clutch disengaging position, and detaining means operable on further movement of said part for securing said member in inactive position and permitting free movement of said part for operating the vehicle.

7. The combination with a motor tractor having an element for driving apparatus separate from the tractor and a clutch lever for disconnecting the motor from the vehicle and from said element, of a frame adapted for attachment to the vehicle and for supporting and protecting the foot against contact with and injury by other parts of the vehicle, a hook on said frame, means for normally moving the hook to position for engaging and retaining said lever in clutch disconnecting position, said hook and lever having cooperating parts for moving the hook to inactive position on extreme movement of said lever, and a detent for securing said hook in inactive position.

8. The combination with a clutch lever normally movable to clutching position, a movably mounted detaining member for holding said clutch lever in unclutching position and means operating automatically when the clutch lever is depressed while the detaining member is engaged therewith for holding the detaining member out of the path of the clutch lever to permit the latter to move to clutching position.

9. The combination with a clutch controlling part, of a member adapted to hold said part in clutch disengaging position, a detent for holding said member withdrawn from the path of movement of said part, an operating portion for said detent independent of the clutch controlling part and adapted to trip said member to permit the same to move into a position for cooperation with said part when in clutch disengaging position, and means normally moving said member to said last mentioned position.

10. In a motor vehicle, the combination with a vehicle frame, of a clutch controlling part, a member mounted on said frame and normally disengaged from said part but adapted to hold said part in a clutch disengaging position and means for retaining said member disengaged from said part automatically operative when the clutch controlling part is in a given position.

11. The combination with a clutch controlling pedal, of a member for retaining said pedal in clutch disengaging position, a supporting frame for said member to which the same is pivotally attached, a spring in cooperation with said frame and member to move the member to a position for engagement with the pedal, a stop on said frame limiting movement of said member by the spring, a shoulder on said frame, a detent pivotally secured to said member and adapted to engage said shoulder to retain the member out of the path of movement of the pedal, an operating member on the detent for tripping the same, said retaining member being provided with a notch and adapted to automatically engage the pedal when the detent is disengaged from the shoulder, and an inclined surface on said retaining member between its notch and pivot and adapted on further depression of the pedal to move the detent into cooperation with the shoulder.

ROBERT W. LEWIS.